United States Patent [19]

Cowell et al.

[11] Patent Number: 4,507,259

[45] Date of Patent: Mar. 26, 1985

[54] AXIALLY STAGGERED SEED-BLANKET REACTOR FUEL MODULE CONSTRUCTION

[75] Inventors: Gary K. Cowell, Monroeville; Carl P. DiGuiseppe, West Mifflin, both of Pa.

[73] Assignee: The United States of America as represented by the Department of Energy, Washington, D.C.

[21] Appl. No.: 437,400

[22] Filed: Oct. 28, 1982

[51] Int. Cl.³ .............................................. G21C 1/00
[52] U.S. Cl. .................................. 376/173; 376/428; 376/435
[58] Field of Search ............... 376/172, 173, 267, 435, 376/428, 419, 426, 420

[56] References Cited

U.S. PATENT DOCUMENTS

| | | | |
|---|---|---|---|
| 2,992,174 | 7/1961 | Edlund et al. | 376/267 |
| 3,022,240 | 2/1962 | Bassett | 376/428 |
| 3,042,598 | 7/1962 | Crowther | 376/419 |
| 3,334,019 | 8/1967 | Bogaardt et al. | 376/426 |
| 3,362,882 | 1/1968 | Sofer et al. | 376/173 |
| 3,396,078 | 8/1968 | Visner | 376/267 |
| 3,960,655 | 6/1976 | Bohanan et al. | 376/173 |
| 4,257,847 | 3/1981 | Gibby et al. | 376/172 |
| 4,273,616 | 6/1981 | Andrews | 376/420 |

FOREIGN PATENT DOCUMENTS 51-8494  1/1976  Japan .................................... 376/428

Primary Examiner—Harvey E. Behrend
Attorney, Agent, or Firm—Michael F. Esposito

[57] ABSTRACT

A heterogeneous nuclear reactor of the seed-blanket type is provided wherein the fissile (seed) and fertile (blanket) nuclear fuels are segregated axially within each fuel element such that fissile and fertile regions occur in an alternating pattern along the length of the fuel element. Further, different axial stacking patterns are used for the fuel elements of at least two module types such that when modules of different types are positioned adjacent to one another, the fertile regions of the modules are offset or staggered. Thus, when a module of one type is surrounded by modules of the second type the fertile regions thereof will be surrounded on all sides by fissile material. This provides enhanced neutron communication both radially and axially, thereby resulting in greater power oscillation stability than other axial arrangements. The arrangements of the fissile and fertile regions in an alternating axial manner minimizes the radial power peaking factors and provides a more optional thermal-hydraulic design than is afforded by radial arrangements.

5 Claims, 8 Drawing Figures

AXIALLY STAGGERED SEED-BLANKET REACTOR FUEL MODULE CONSTRUCTION

FIELD OF THE INVENTION

This invention relates to nuclear reactors and more particularly, to heterogeneous reactor cores of the seed-blanket type.

BACKGROUND OF THE INVENTION

A long lifetime nuclear reactor of the type on which the present invention is an improvement is disclosed in U.S. Pat. No. 3,252,867 (Conley). Such heterogenous reactors have been used as power producing reactors in a number of locations and for example, have been constructed using a seed of highly enriched uranium-235 and a blanket of natural uranium.

A Light Water Breeder Reactor (LWBR) has been built using a seed of uranium-233 and a blanket of thorium-232. Both of these heterogeneous nuclear systems have utilized seed-blanket constructions wherein the fissile (seed) and fertile (blanket) nuclear fuels are segregated in a radial fashion throughout the core. This construction has resulted in radial core regions of high power density which lie adjacent to radial core regions of low power density, thereby producing relatively high radial power peaking, and hydraulic orificing has been required to balance the thermal performance of the core.

The Conley reference mentioned above specifically concerns a seed-blanket reactor wherein a plurality of seed regions are disposed in radially spaced relationship with a blanket region surrounding each of the seed regions. Other patents of possible interest here include U.S. Pat. Nos. 2,992,174 (Edlund et al); 3,211,621 (Creagan); 3,396,078 (Visner); 3,660,227 (Ackroyd et al); 3,671,392 (Beaudoin et al); 3,960,655 (Bohanon); and 4,257,847 (Gibby et al). These patents disclosed various arrangements of the fertile and fissile fuel materials in the fuel element of breeder reactors. For example, the Beaudoin et al patent discloses a light-water breeder reactor including a specific axial arrangement of fertile and fissile fuel materials and the Gibby et al patent discloses a nuclear breeder reactor including a particular arrangement of fertile and fissile fuel material within the reactor core. The Creagan patent discloses a breeder or converter type neutronic reactor including a particular arrangement of fissile and fertile fuel.

SUMMARY OF THE INVENTION

This invention relates to a nuclear fuel element construction which offers improved nuclear and thermal-/hydraulic performance over other, conventional seed-blanket fuel element constructions. A key feature of the invention concerns the provisions of an alternating module construction comprising at least two module types which have different axial stacking arrangements of seed (fissile enriched) and blanket (fertile) fuel pellet regions, such that an axial overlap of seed regions is produced between adjacent modules and such that each blanket region is surrounded as completely as possible by seed regions. The blanket regions of one type of module are axially shorter than the seed regions and, with the arrangement of the invention, axially coincide with seed regions in the other types of modules. This enhances the neutron communication between the different module types, thereby increasing stability insofar as axial and radial power oscillations are concerned.

The fuel element construction of the invention takes advantage of the superior conversion characteristics of seed-blanket fuel constructions including increased lifetime, and through the use of an axial arrangement of the seed and blanket regions in the different module types, produces a more even power deposition in the coolant in the radial direction. The latter advantage results from the fact that with axial coolant flow, all coolant flow passes through both seed and blanket regions with this axial seed-blanket arrangement. As mentioned above, conventional reactors of the seed-blanket type employ radial segregation of the fissile and fertile nuclear fuels, which produces radial core regions of high power density and therefore requires special hydraulic orificing to balance the thermal performance of the core.

The axially staggered seed-blanket fuel element construction of the invention involves two principles. First, the arrangement of the fissile and fertile regions in an alternating axial manner minimizes the radial power peaking factors and provides a more optimal thermal-hydraulic design. This is particularly important in core constructions in which the coolant flows axially through the power producing regions of the core. Second, arrangement of the axial seed-blanket pattern in a different and staggered manner in each of at least two module types, which modules are, in turn, located in an alternating sense radially throughout the core, provides enhanced stability against power oscillations. As discussed below, calculations have shown that arbitrary axial arrangements of the seed-blanket regions often lead to high axial peaking factors and highly unstable axial power distributions.

Other features and advantages of the present invention will be set forth in, or apparent from, the detailed description of the preferred embodiments of the invention found hereinbelow.

DESCRIPTION OF THE PREFERRED EMBODIMENTS

Figure 1:
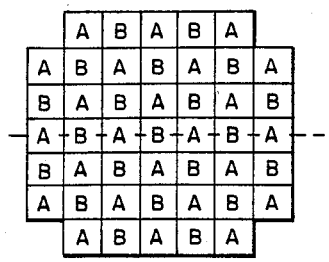
FIG. 1 is a schematic plan view of a heterogeneous reactor core illustrating a first pattern of square modules.
Figure 2:
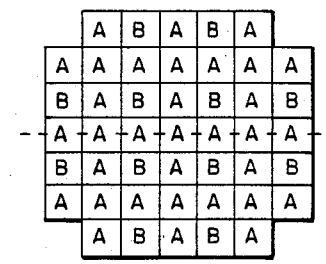
FIG. 2 is a schematic plan view similar to that of FIG. 1 illustrating a second pattern of square modules.
Figure 3:
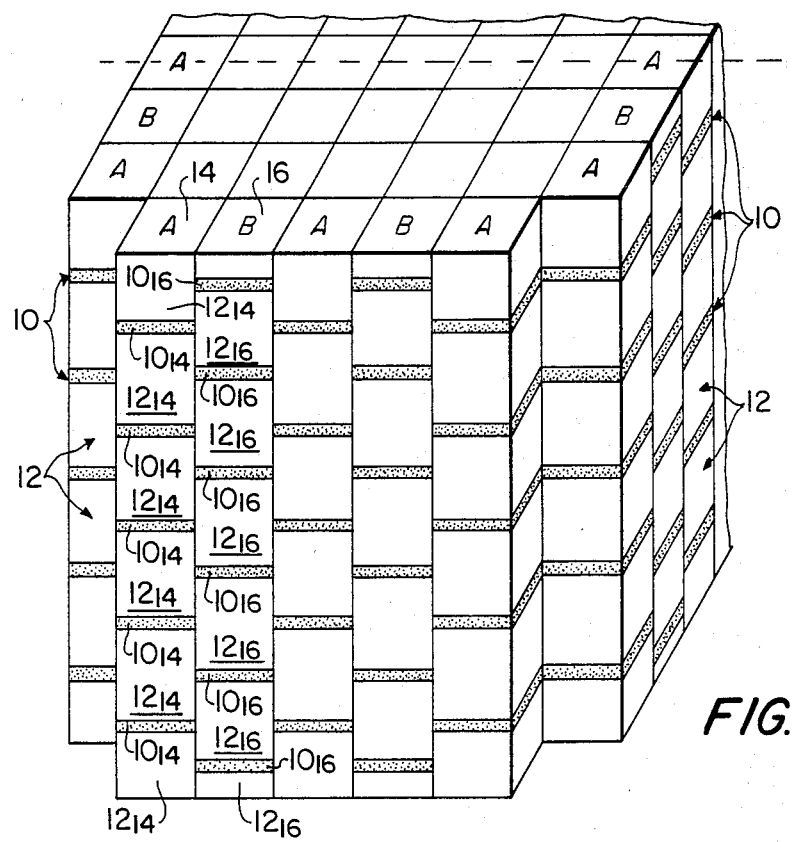
FIG. 3 is a schematic perspective view of a portion of a heterogeneous reactor core employing square modules and illustrating the axially offset or staggered relationship between the blanket and seed regions.

Referring to FIGS. 1, 2 and 3, two embodiments of a "square" arrangement of type "A" and type "B" modules are illustrated. As seen in FIG. 1, in a first embodiment, the type "A" and type "B" are arranged radially in an alternating manner so that, apart from the modules located at the edges, each side of each "A" module borders on the adjacent side of a "B" module and each side of each "B" module borders on the adjacent side of an "A" module. In the embodiment of FIG. 2, the "A" modules are arranged in a first series of spaced rows which are crossed by a second series of spaced rows orthogonal to the first rows and the "B" modules are disposed in an alternating pattern between the rows of "A" modules so that each of the "B" modules is surrounded on all four sides by "A" modules. It is noted that the locations of the "A" and "B" modules may be interchanged everywhere so as to produce a pattern which is the inverse of those illustrated and thereby provide additional embodiments of the same characteristics, i.e., patterns wherein at least one of the module types "A" or "B" is surrounded on all sides by modules of the other type.

Referring to FIG. 3, a perspective view is provided which shows the alternating or staggered axial arrangement of the blanket regions 10 and seed regions 12 as well as the staggered relationship of the modules themselves. Thus, considering the type "A" module denoted 14 as typical, it will be seen that the blanket regions $10_{14}$ alternate with the seed regions $12_{14}$ along the length of module 14. Further, considering one of the next adjacent "B" modules, denoted 16, it will be seen that the alternating blanket regions $10_{16}$ and seed regions $12_{16}$ are staggered in relationship to those of module 14, thus, the seed regions $12_{16}$ of module 16 all lie adjacent to blanket regions $10_{14}$ of module 14 and the seed regions $12_{14}$ of module 14 all lie adjacent to blanket regions $10_{16}$ of module 16.

Figure 4:
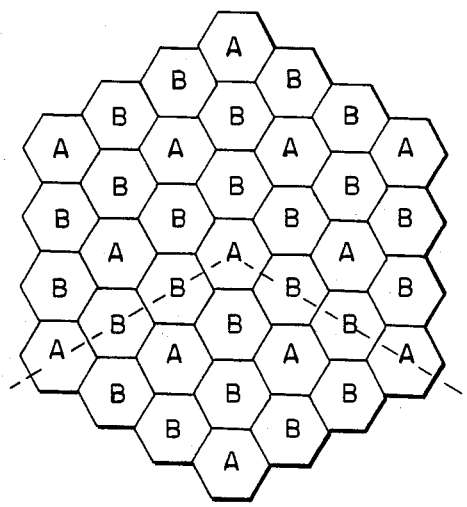
FIG. 4 is a plan view similar to FIGS. 1 and 2 illustrating a pattern of hexagonal modules.
Figure 5:
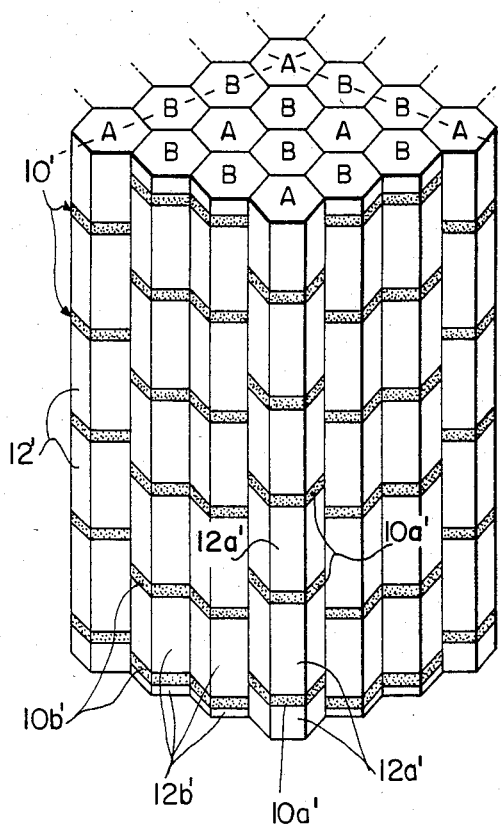
FIG. 5 is a perspective view similar to FIG. 3 illustrating the relationship between a section of the modules of FIG. 4.

A further embodiment of the inventions is shown in FIGS. 4 and 5 wherein the modules are hexagonal in shape. As illustrated in FIG. 4, the pattern of "A" and "B" modules, as viewed in plan, is such that all of the "A" modules (except those at the edge of the core) are surrounded on all six sides by "B" modules. Further, as shown in FIG. 5, the blanket regions, generally denoted 10', are arranged axially relative to seed regions, generally denoted 12', in the "A" and "B" modules such that the blanket regions 10a' of the "A" modules are staggered axially relative to the blanket regions 10b' of the "B" modules. Thus, as illustrated, the blanket regions 10a' of the "A" modules are surrounded on all sides by seed material, viz, seed material 12a' of its own module in an axial direction and seed material 12b' of adjacent "B" modules in a radial direction.

Figure 6:
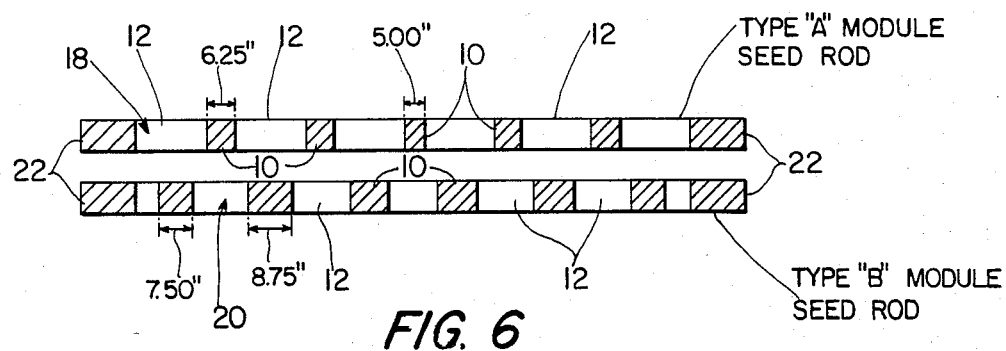
FIG. 6 is a schematic representation of the individual fuel rod of the invention.

The axial material arrangements of the individual "A" and "B" type fuel rods of the axially staggered seed-blanket core design of the invention are shown in somewhat more detail in FIG. 6, wherein a type "A" module seed rod is shown at 18 and a type "B" seed rod at 20. The seed and blanket regions are denoted 10 and 12 as in FIGS. 1 to 3 and typical values for the lengths of the blanket regions are indicated in FIG. 6. Reflectors 22 are located at each end of the two rods 18 and 20.

An evaluation of the fuel element construction of the invention was made using the core design features of an equilibrium cycle light water breeder reactor which uses a $^{233}UO_2\text{-}ThO_2$ based fuel system. An axially staggered seed-blanket fuel construction such as described above was incorporated into this design replacing the standard binary fuel rods. Comparisons of nuclear performance characteristics were made between the construction of the invention and the base construction. The base design utilized for the evaluations is a 1000 MW(e) light water equilibrium cycle breeder concept which fits into a 256-inch ID vessel. This design has an equilibrium cycle fissile inventory ratio (FIR) greater than 1.01, where FIR is defined as the ratio of fissile fuel produced to fissile fuel input for the cycle. The core is capable of daily swing load operation between 50% and 100% of full power using the control rods for reactivity control. One third of the core is refueled each year. Results indicate that by incorporating the axially staggered seed-blanket arrangement of the invention into this design, this core can be batch depleted for approximately four years and will provide a slightly higher equilbrium cycle FIR.

The base design utilized for the evaluation consists of 211 hexagonal fuel modules, 42 high power blanket modules of reduced size which are used to flatten the power shapes at the core periphery, and 54 thoria reflector modules adjacent to the core barrel. The 211 hexagonal fuel modules are arranged on a 13-inch hexagonal pitch. The fuel stack height of the base design utilized for the evaluation is 12 feet, consisting of a 10-foot binary ($UO_2\text{-}ThO_2$) pellet stack with 1-foot top and bottom reflector blanket stacks of thoria pellets.

Considering the axially staggered seed-blanket fuel design which was incorporated into the base design for comparison purposes, the binary fuel rods (seed rods) are fueled with alternate stack lengths of binary (seed) and thoria (blanket) pellets. Two module types were utilized for the evaluation, with different axial arrangements of the blanket regions to produce an axial overlap of seed regions between the two module types as shown in FIG. 6. As noted above, this arrangement enhances the neutron communication between the two module types and provides increased stability against power oscillations.

A diffusion theory 2-D (R-Z) module was used in the analysis of both the axially staggered seed-blanket construction of the invention and the base construction. The model represented three modules (two Type A and one Type B) with a zero-current boundary condition to simulate an infinite array of these three modules. Only the axial geometry descriptions of the binary fuel rods differed between the two cases which were analyzed. Both diffusion theory models were depleted at predetermined eigen-values which were selected to account for leakage effects in a full core batch loaded representation for the axially staggered seed-blanket design model and a three-zone, fuel managed representation for the base design model. Control rod positions were moved throughout life to obtain these predetermined eigen-values.

Figure 7:
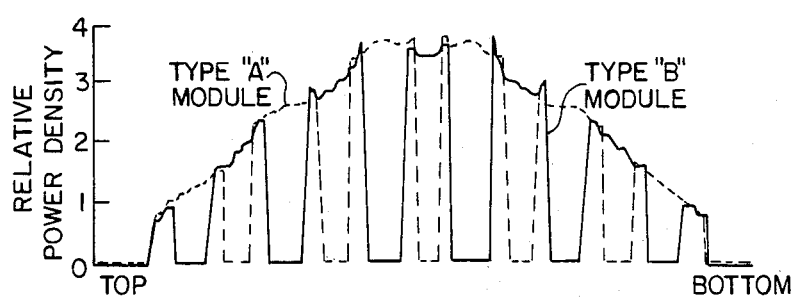
FIGS. 7 and 8 are graphs showing the axial power shapes exhibited by a core constructed in accordance with the invention.
Figure 8:
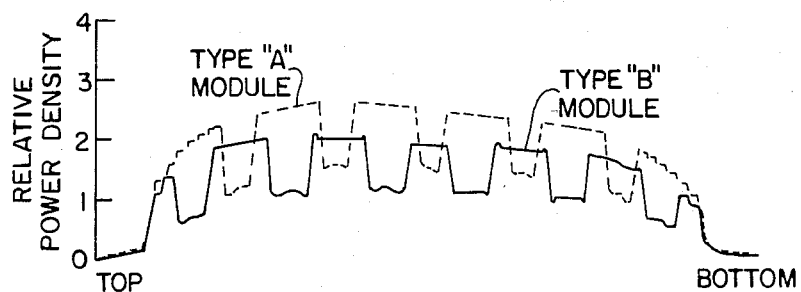

Referring to FIGS. 6, 7 and 8 there are shown, respectively the axial material arrangements in the fuel rods of the Type A and Type B modules (FIG. 6), the axial power shape produced at 0 hours (FIG. 7) and the axial power shape at 26,300 hours (FIG. 8) (4 years at 75% capacity) for an axially staggered seed-blanket core constructed in accordance with a specific embodiment of the invention. It is noted that the thoria layers produce a significant amount of power at 26,300 hours.

Comparing the control rod motion of the two constructions with lifetime, it is noted that in the axially staggered seed-blanket construction the control rods are initially withdrawn as xenon, samarium and protactinium buildup to equilibrium levels, are re-inserted slightly between about 5000 hours and about 11000 hours to control an increase in reactivity and finally are withdrawn again after about 11000 hours. Table 1 below is a comparison of the performance characteristics of the two constructions. Both constructions have a 1000 MW(e) power rating but slightly different NW(th) ratings. The axially staggered seed-blanket construction achieves 33.6% higher burnup than the base construction at the expense of 11.0% lower kw(th)/kg-fissile specific power. The FIR for the initial cycle for the axially staggered seed-blanket construction is estimated to be 1.029 and for the equilibrium cycle 1.012. These values are slightly higher than the corresponding FIR's of 1.028 and 1.011 calculated for the base design for its cycle lifetime. It is noted that the axially staggered seed-blanket construction offers a 4-year batch loaded operation of the core as compared to annual partial refuelings for the base construction. The axially staggered seed-blanket construction requires a 5.4% higher total fissile loading commitment for incore and excore inventories, but offers 13.2% greater potential energy extraction form heavy metal resource.

TABLE 1

Performance Characteristics of Evaluated Constructions

| Parameters | Base Construction | Axially Staggered Seed-Blanket Construction |
|---|---|---|
| Core Power, MW(e) | 1000 | 1000 |
| MW(th) | 2992 | 2994 |
| Module Power density, | | |
| kW (th)/kg-fissile | 607 | 540 |
| kW (th)/liter | 47.0 | 47.0 |
| FIR - initial cycle | 1.028 | 1.029 |
| equilibrium cycle | 1.011 | 1.012 |
| Burnup, MWD/MT | 7332 | 9794 |
| Energy potential, GWD/MT | 403 | 456 |
| Peak thermal output of fuel rods kw/ft | 12.6 | 13.3 |
| Lifetime, yr. module | 3 | 4 |
| Refueling cycle, yr. | 1 | 4 |

Peak linear power density values were calculated using the results obtained from the module calculations and applying hot module and physics uncertainty factors as well as accounting for gamma heating effects. For the axially staggered seed-blanket construction originally analyzed, the peak linear power density obtained for the binary seed rods was 15.1 kw/ft compared to a limit of 14 kw/ft. The following actions were taken to produce an acceptable linear power in the binary fuel rods. An adjustment of the relative fissile loadings in the Type A and Type B modules was made to reduce the power in the module type with the limiting binary seed rod by approximately 6%. This reduced the peak linear power in the binary rods to 14.4 kw/ft. The total binary fuel length in the seed rods was then increased by approximately 3% by reducing the thoria layer thicknesses to achieve a further reduction in binary rod peak linear power to a value under 14 kw/ft. Calculations to confirm that these changes result in acceptable binary rod linear power (14 kw/ft) were performed and a peak binary linear power of 13.3 kw/ft was obtained. For the base construction, the peak linear power density obtained for the binary seed rods was 12.6 kw/ft which is below the 14 kw/ft limit.

Further optimization of the particular axially staggered axial seed-blanket concept that was evaluated might produce additional improvements. An initial study of a concept with thinner blanket layers produced a design with a 2.3-year batch core lifetime. The use of thicker blanket layers could possibly increase the core lifetime at the expense of increasing the fissile loading. However, the use of thicker blanket layers would reduce the axial overlap of seed regions between the two module types, tending to decrease core stability.

It will be understood that the fuel element construction of this invention can be used with several types of fuel and control systems. More particularly, in addition to the uranium-thorium oxide fuel system which was analyzed, several other fuel systems could also be employed. A $UO_2$ fuel system consisting of enriched $^{235}UO_2$ seed regions and natural uranium blanket regions would offer improved fuel utilization relative to conventional fuel systems in once-through fuel applications. This fuel system could eventually be converted to a $PuO_2$-$UO_2$ system with natural uranium blanket regions which would further reduce the requirements of enriched $UO_2$. Another possible fuel system would consist of enriched $^{235}UO_2$ seed regions and $ThO_2$ blanket regions. The uranium-233 produced in the thoria blanket layers could be used in a light water breeder reactor concept consisting of $^{233}UO_2$-$ThO_2$ based fuel. Other combinations of nuclear fissile and fertile fuels could offer potential improvements in fuel utilization with the use of the fuel element construction of the invention.

It is noted that the fuel element construction of the invention can be used with any combination of fissile and fertile materials. The seed regions can be composed of uranium-233, uranium-235, plutonium-239 or plutonium-241 or a combination of these. The seed fissile material can be in combination with a fertile diluent such as thorium, natural uranium or depleted uranium or a combination of these. The seed fissile material may also be in combination with a non-fertile diluent such as zirconium. Other diluent combinations are, of course, possible. The blanket fertile material can be composed of thorium, natural uranium or depleted uranium or a combination of these. Both seed and blanket materials may be utilized in metallic or non-metallic (e.g., oxide or nitride) form.

Either a poison control system (Boron, AG-CD-In, etc. control rods or solution poison) or a movable fuel control system (fissile or fertile) could be used with the fuel element construction of the invention. The choice of reactivity control system would influence the resulting increase in fuel utilization. As discussed above, the fuel element construction of the invention can be used in both square and hexagonal fuel module arrays. In square arrays with two module types, the same number of modules of each of the two module types can be used (see FIG. 1) or there can be three times as many modules of one type as there are of a second type (See FIG. 2). In hexagonal arrays with two module types, there are two modules of one type for every module of the second type (See FIGS. 4 and 5). In hexagonal arrays with three module types (not illustrated) there would be an equal number of modules of each type.

Although the invention has been described in detail with respect to exemplary embodiments thereof, it will be understood by those of ordinary skill in the art that variations and modifications may be effected in these embodiments within the scope and spirit of the invention.

We claim:

1. In a nuclear reactor employing a heterogeneous reactor core of blanket and seed nuclear fuel materials, the improvement comprising the provision of fuel rod modules of at least first and second types, each of said modules comprising alternating seed and blanket nuclear fuel regions along the length thereof, modules of the first and second type being positioned adjacent to one another and the axial locations of said seed and blanket regions of said fuel rod modules of said first type being offset relative the axial locations of said seed and blanket regions of said fuel rod modules of said second type so that the blanket regions of said first and second type modules lie adjacent to said seed regions of said second and first type modules, respectively and said blanket regions of said first and second modules are of different axial lengths respectively and are of substantially shorter axial lengths than said seed regions.

2. A nuclear reactor as claimed in claim 1 wherein said modules are arranged in plan such that modules of the first type, except for those at the edge of the core, are surrounded on all sides thereof by modules of the second type.

3. A nuclear reactor as claimed in claim 2 wherein said modules are square in shape and modules of each of the two types are surrounded on all four sides by modules of the other type.

4. A nuclear reactor as claimed in claim 2 wherein said modules are hexagonal in shape and modules of the first type are surrounded on all sides by modules of the second type.

5. A nuclear reactor as claimed in claim 1 wherein the modules are square in shape and the modules are arranged in rows of alternating module types such that the blanket regions of all of the modules of one type except for those at the edge of the core are surrounded by the seed regions of adjacent modules.

* * * * *